Patented Mar. 25, 1930

1,751,579

UNITED STATES PATENT OFFICE

GUSTAF W. ENGSTROM, OF RIVERSIDE, ILLINOIS, ASSIGNOR TO INTERNATIONAL HARVESTER COMPANY, A CORPORATION OF NEW JERSEY

TRANSMISSION MECHANISM FOR TRACTORS

Original application filed July 28, 1922, Serial No. 578,071. Divided and this application filed June 4, 1925. Serial No. 34,784.

This invention relates to tractors and particularly to a transmission mechanism therefor. More particularly it relates to a transmission mechanism for a steam propelled tractor of the type disclosed in my copending application filed July 28, 1922, bearing Serial No. 578,071, of which the present application is a division.

It is an object of this invention to provide a simple and compact transmission mechanism for a tractor, and particularly for a steam tractor, which will enable such tractors to be constructed in small sizes of equal or greater power and of less first cost and operating expense than correspondingly sized gas engine tractors now commonly in use.

Another object is so to mount an engine with respect to a differential transmission mechanism carried on the axle of a tractor as to permit a compact arrangement with a minimum of parts without sacrificing the efficiency thereof.

Other objects will be apparent to those skilled in this art as the description progresses.

These objects are briefly accomplished in the combination with a tractor having the usual stub axles carrying the rear wheels of such tractor, of a transmission mechanism embodying a differential for imparting rotation to such stub axles, said transmission being directly geared to the stub axles and enclosed in a casing supporting directly thereover an engine having a crank shaft parallelly arranged with the stub axles and geared therewith for imparting rotative movement thereto.

The preferred embodiment of the invention is illustrated in the accompanying sheet of drawings, like characters of reference denoting like parts throughout the views, and wherein,—

Figure 1:
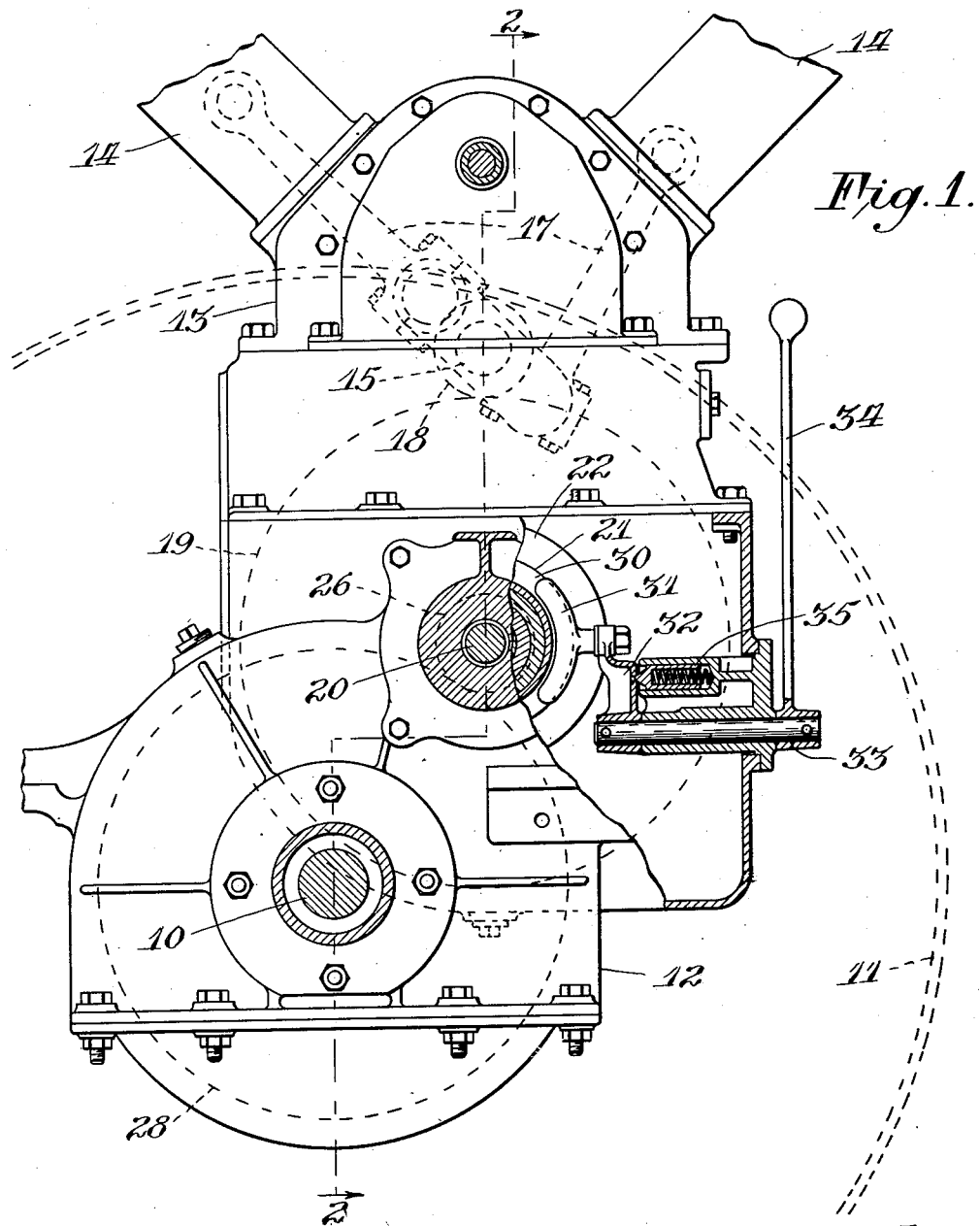
Figure 2:
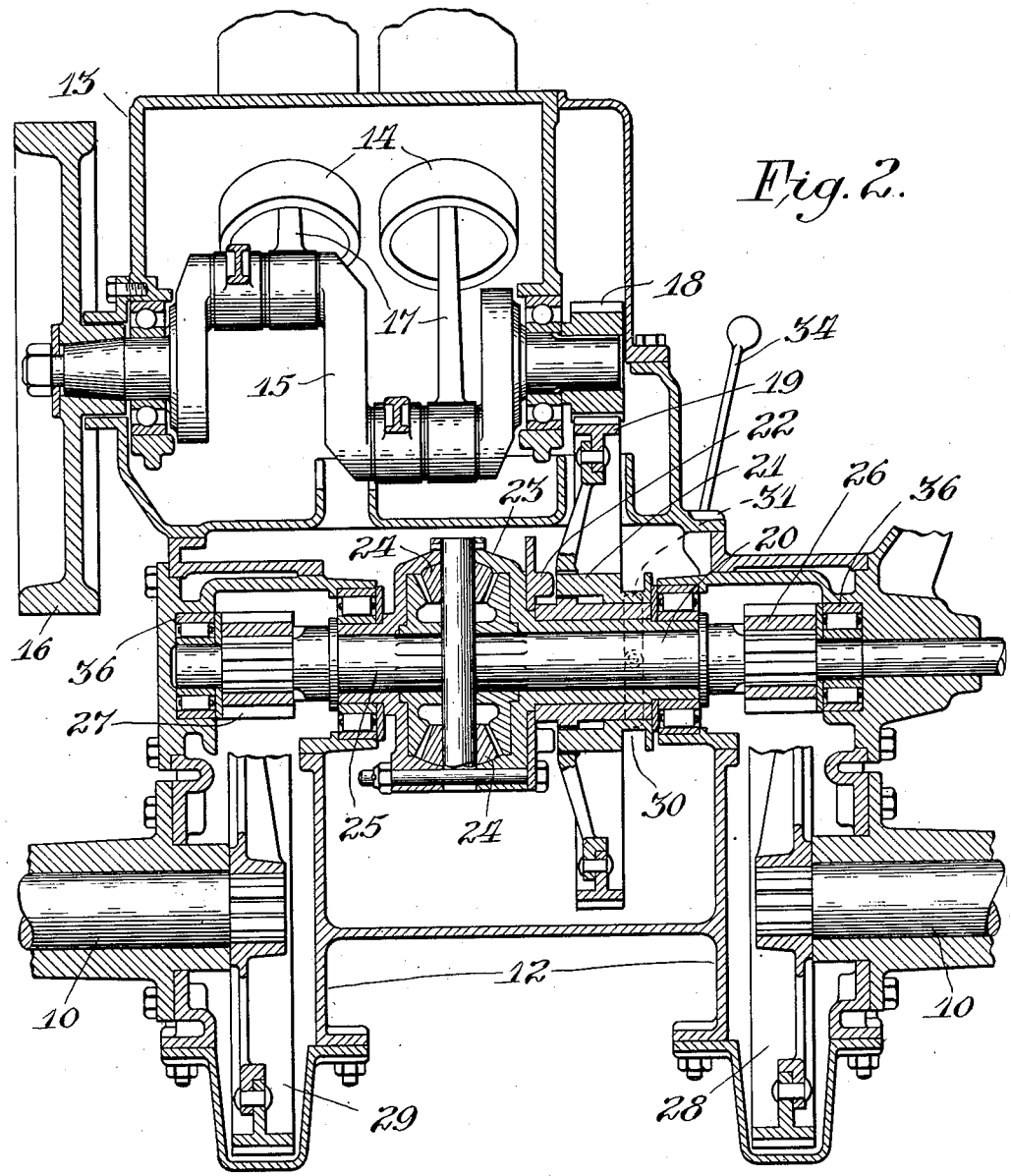

Fig. 1 is an end elevation of the engine and transmission carried on the tractor axles; and Fig. 2 is a section of the mechanism shown in Fig. 1 taken along the sectional line 2—2, looking in the direction of the arrows in said figure.

The tractor, not shown, has a pair of conventional, aligned stub axles 10 each of which has keyed thereto for rotation therewith the usual rear tractor supporting and driving wheels 11, the stub axles being journaled in a transmission and differential casing 12 supported thereon. Directly above the casing 12 is a casing 13 comprising the crank case of a driving engine, and in the present preferred embodiment is a uniflow engine of the V type having cylinders 14 arranged on each side of the crank case. The crank case has journaled therein a crank shaft 15 arranged in parallel with the stub axles 10 of the tractor and substantially thereabove, said crank shaft having the usual fly wheel and belt pulley 16 thereon outside of the casing 13, the crank shaft receiving its rotative movement in a conventional manner by means of connecting rods 17 operable by pistons, not shown, and reciprocable within the cylinders 14. The crank case 13, it will be observed, is bolted to the transmission and differential casing 12 and directly thereover, so that the entire weight thereof bears down on the axles and is supported by the rear wheels 11 in a very compact manner and to the end that such wheels 11 will have a greater tractive effort.

The crank shaft carries at its end away from the fly wheel 16 a gear 18 which meshes with a gear 19 journaled on a differential shaft 20, said gear 19 being provided with a clutch element 21 adapted to engage a corresponding clutch element 22 on a differential drum 23, said drum housing a conventional differential gear mechanism 24 connecting the shaft 20 and a second differential shaft 25 in common axial alignment therewith. The differential shafts are provided on their outer ends with pinions 26 and 27, which respectively mesh with gears 28 and 29 keyed to the stub axles 10 for driving the rear tractor supporting wheels 11. The clutch 21 is provided with a groove 30 adapted to be engaged by a shipper fork 31 secured to an arm 32 fast on a rock shaft 33, which may be rocked by means of a hand lever 34 for engaging or disengaging the clutch. A spring pressed detent 35 engages the arm 32 to retain the clutch in engaged or disengaged positions in any suitable manner. It will be observed that the differential shaft 20 is extended through the casing 12 for the purpose of receiving a brake drum or other braking mechanism, not shown, for imparting a braking action directly to the transmission. The differential shafts are journaled at their outer ends in bearing cages 36, as shown.

From the above disclosure it is apparent that the object of providing a compact and simple driving arrangement for a tractor and particularly for one driven by a steam engine has been attained. The transmission and differential casing 12 and crank case 13 provide lubricant containing chambers for the engine and driving connections to the rear wheels as will be apparent.

As various possible embodiments might be made of the above invention and as various changes might be made in the particular embodiment set forth, it is to be understood that all matter herein shown and disclosed is to be interpreted as illustrative and not in a limiting sense.

What is claimed is:

1. The combination with an engine having a crank case, of a transmission casing on top of which the crank case is mounted, a crank shaft journaled in the crank case and having a gear fixed thereon, two differential shafts journaled in the transmission casing, differential gearing connecting the differential shafts, a driving gear rotatably mounted on one of the differential shafts, a clutch adapted to connect the driving gear and differential gearing, means for operating the clutch, two spaced stub axles journaled in opposite sides of the transmission casing, a gear on each stub axle, and a gear on each differential shaft in mesh with each gear on the stub axles.

2. The combination in a tractor having a wheel supported rear axle, of a differential casing supported on and above said axle, differential gearing in said casing, an engine including a crank case and a crank shaft mounted on and directly above the differential casing, and operative connections between the crank shaft, differential gearing, and the axle.

3. In a tractor having a wheel supported rear axle, the combination of a differential mechanism located substantially above said axle, and an engine for driving said differential mechanism located substantially above said differential mechanism.

4. In a driving mechanism for a tractor having a wheel supported rear axle, a transmission unit including a differential, an engine, the transmission unit located on and substantially vertically above the axle, and the engine located on and substantially vertically above the transmission unit.

5. In a driving mechanism for a tractor having a pair of wheel supported rear stub axles, the combination of a differential mechanism connected to said axles and located thereabove, and an engine drivingly connected to the differential mechanism and located directly thereabove.

6. In a driving mechanism for a tractor having a main transmission including a differential having a pair of differential shafts, a housing therefor including two spaced depending parts, a stub axle protruding from each depending housing part, gearing connecting the stub shafts with the differential shafts, said transmission housing being located vertically above the stub axles, and an engine unit including a crank shaft geared to the main transmission, said engine unit located on and vertically above the transmission housing.

In testimony whereof I affix my signature.

GUSTAF W. ENGSTROM.